US006625666B1

(12) United States Patent
Kim

(10) Patent No.: US 6,625,666 B1
(45) Date of Patent: Sep. 23, 2003

(54) OPERATION-RECORDING TYPE SYSTEM FOR A DDC MONITOR AND RELATED METHOD

(75) Inventor: Hong-Jae Kim, Seoul (KR)

(73) Assignee: Samsung Electronics Co., Ltd., Suwon (KR)

(*) Notice: Subject to any disclaimer, the term of this patent is extended or adjusted under 35 U.S.C. 154(b) by 0 days.

(21) Appl. No.: 09/557,958

(22) Filed: Apr. 25, 2000

(30) Foreign Application Priority Data

Sep. 9, 1999 (KR) ........................................ 1999/38452

(51) Int. Cl.[7] .................................................. G06F 3/00

(52) U.S. Cl. ................................ 710/5; 710/1; 710/15; 710/62; 345/10; 345/11; 345/204; 345/698

(58) Field of Search ........................... 710/1, 15, 5, 62; 345/204, 10, 11, 698

(56) References Cited

U.S. PATENT DOCUMENTS 4,816,815 A * 3/1989 Yoshiba ...................... 345/538
5,602,567 A * 2/1997 Kanno ......................... 345/11
5,691,741 A * 11/1997 Kerigan et al. ............. 345/698
5,727,191 A * 3/1998 Konishi et al. ............. 345/698
5,910,806 A * 6/1999 Narui et al. .................. 345/11
5,917,468 A * 6/1999 Han ........................... 345/204
5,995,089 A * 11/1999 Choi ........................... 345/13
6,323,828 B1 * 11/2001 Perez .......................... 345/10

* cited by examiner

*Primary Examiner*—Jeffrey Gaffin
*Assistant Examiner*—Niketa Patel
(74) *Attorney, Agent, or Firm*—Robert E. Bushnell, Esq.

(57) ABSTRACT

An operation-recording type system for controlling a display data channel (DDC) monitor utilizes a control method wherein information of externally inputted signals is recorded in a storage device upon receipt of externally inputted signals; an operation corresponding to the externally inputted signals is carried out by a microcomputer; the operation corresponding to the externally inputted signals is recorded in the storage device; and the externally inputted signals and the corresponding microcomputer operations are recorded in the storage device. Therefore, the user of the monitor can easily identify the cause of abnormal operation, thereby making it easy to correct errors.

24 Claims, 3 Drawing Sheets

OPERATION-RECORDING TYPE SYSTEM FOR A DDC MONITOR AND RELATED METHOD

CLAIM OF PRIORITY

This application makes reference to, incorporates the same herein, and claims all benefits accruing under 35 U.S.C. §119 from my application A MICROCOMPUTER OF A OPERATION RECORDING TYPE IN A DDC MONITOR filed with the Korean Industrial Property Office on September 1999 and there duly assigned Ser. No. 38452/1999.

BACKGROUND OF THE INVENTION

1. Field of the Invention

The present invention relates to an operation-recording type system and method for a display data channel (DDC) monitor. More specifically, the present invention relates to an operation-recording type system for a DDC monitor and a related method, in which externally inputted signals and the corresponding microcomputer operations are recorded in a storage device.

2. Description of the Prior Art

Recently, in order to provide more convenient computer environments to users, a plug & play method has been introduced into computer systems.

The term "plug & play" is intended to suggest that, when installing a board or peripheral equipment, once the cable is plugged in and power is supplied, then the computer automatically forms a user environment so that the installed board or the peripheral equipment can be directly used, thereby satisfying an optimum condition.

In this connection, existing general computers simply receive signals and display them, whereas the plug & play monitor makes it possible to exchange information with the computer. That is, in the latter regard, the monitor should be able to provide information on the optimum usable modes and on various adjustment statuses to the computer.

Accordingly, if the monitor to which the plug & play method is applied is connected through a cable to a computer, and if the monitor is activated, then the computer automatically selects the optimum usable mode, and provides an optimally adjusted picture to the user.

If the plug & play method is applied to the monitor in this manner, the monitor has to store its own information, and a protocol has to be present for transmitting the information to the computer.

Therefore, the Video Electronic Standards Association (VESA), which is a non-profit corporation and which has been incorporated by the computer and peripheral equipment industries of the United States, has prepared a standard for the DDC transmission method for use on the plug & play monitor.

In the latter regard, the DDC transmission method defines the communication channel between the computer and the monitor. That is, it is a protocol for transmitting monitor information to the computer, or for modifying the monitor information by using a keyboard or mouse.

Normally, the existing monitor is limited to displaying the unilateral signals of the video card. However, by using the DDC, the monitor can communicate with the computer as to the display and the information capability. Furthermore, unified communications between the computer, the monitor, the keyboard and the mouse are made possible. In such a monitor in which the DDC method is applied, when peripheral equipment is procured, it can be immediately used, even without a manual and without going through a display resolution setting procedure, thereby ensuring convenience.

In the DDC monitor, there are a unilateral transmission method and a bilateral transmission method. In the unilateral transmission method, the monitor information is furnished to the computer. In the bilateral transmission method, not only is the monitor information furnished to the computer, but also the computer can furnish information to the monitor.

For example, "DDC1" is the most elementary communication method, and is a unilateral transmission method in which the monitor information can only be furnished to the computer. In this method, however, the computer cannot control the information transmission.

If this monitor is connected to the computer and if power is supplied to the monitor, the monitor furnishes the information to the computer. Then the computer furnishes the optimum signals, so that the monitor can provide a display suitable to the fished information.

"DDC2B" is a bilateral transmission method in which bilateral communications between the monitor and the computer are possible. This is based on an $I^2C$ protocol.

"DDC2AB" is a complete bilateral transmission method in which the information exchange between the monitor and the computer can be arbitrarily carried out. In this method, an access bus which makes it possible to modify the monitor information is used. Therefore, in the DDC2AB monitor, the conventional peripheral equipment, the keyboard and the mouse can be directly connected.

An operation abnormality of the monitor occurs upon inputting abnormal video signals or upon key-inputting by the user. Even if an operational abnormality of the monitor occurs, it is not easy for the user to find the cause of the abnormality.

That is, when certain video signals are inputted into the DDC monitor, or when the user has pushed a certain key, if a malfunction of the microcomputer is to be confirmed, then one of the following actions has to be carried out. That is, the user has to press the adjustment key many times, or turning on and off of the power has to be repeated, or an oscilloscope has to be used to test many points on the circuit board. These are very troublesome tasks.

SUMMARY OF THE INVENTION

The present invention is intended to overcome the above-described disadvantages.

Therefore, it is an object of the present invention to provide an operation-recording type system and method for use in a DDC monitor, in which externally inputted signals and corresponding microcomputer operations are recorded in a storage device.

In achieving the above object, the method according to the present invention includes the steps of: recording information of externally inputted signals into a storage device upon receiving the externally inputted signals; carrying out an operation corresponding to the externally inputted signals; and recording the operation corresponding to the externally inputted signals in the storage device.

In this manner, the externally inputted signals (inputted into the monitor) and the operation of the microcomputer based on the externally inputted signals are recorded in a storage device. Therefore, if an abnormality occurs in the monitor, the cause of the abnormality can be easily determined, thereby making it easy to correct errors.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENT

Figure 1:
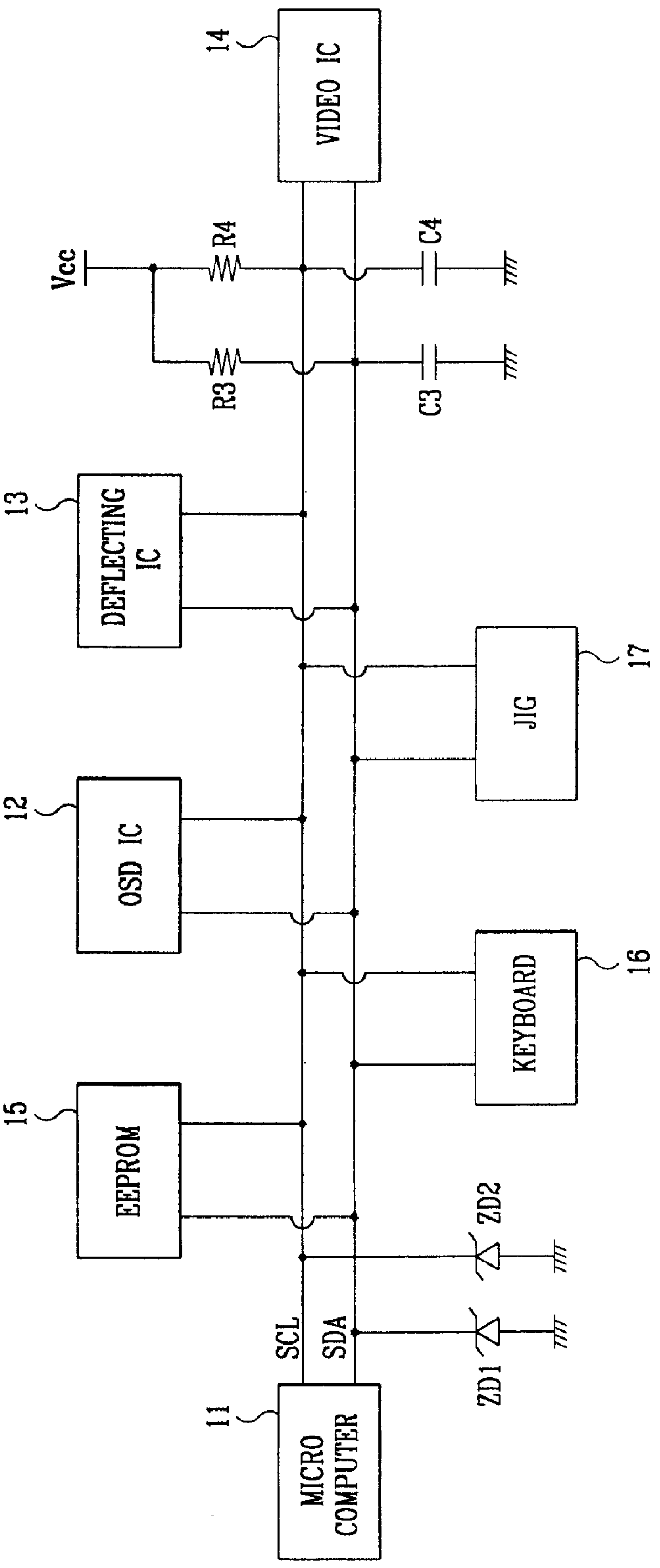
FIG. 1 is a circuit diagram showing the connections between the microcomputer of a DDC monitor and its peripheral integrated circuits.

FIG. 1 is a circuit diagram showing the connections between the microcomputer of the DDC monitor and its peripheral integrated circuits (IC). A microcomputer 11 of the DDC monitor utilizes an SDA signal line and an SCL clock line to exchange data with on-screen display (OSD) IC 12, a deflecting IC 13, a video IC 14, a keyboard 16, a jig 17, and the like.

The SDA signal line and the SCL clock line are protected from the impact of electrostatic charge by zener diodes ZD1 and ZD2. Further, the SDA signal line and the SCL clock line are connected through pull-up resistors R3 and R4 to a power source Vcc. Moreover, noise is removed by capacitors C3 and C4.

The microcomputer 11 executes the protocol based on the DDC1 or DDC2 methods so as to process communications between the monitor and the computer. Furthermore, microcomputer 11 is provided with an electronically erasable programmable read-only memory (EEPROM) 15 for storing the data which are transmitted during communication with the computer.

An operation abnormality of the monitor can occur upon inputting abnormal video signals or upon key-inputting by the user. When an operational abnormality of the monitor occurs, it is not easy for the user to find the cause of the abnormality.

That is, when certain video signals are inputted into the DDC monitor, or when the user has pushed a certain key, if a malfunction of the microcomputer is to be confirmed, then one of the following actions has to be carried out. That is, the user has to press the adjustment key many times, or turning on and off of the power has to be repeated, or an oscilloscope has to be used to test many points on the circuit board. These are very troublesome tasks.

Figure 2:
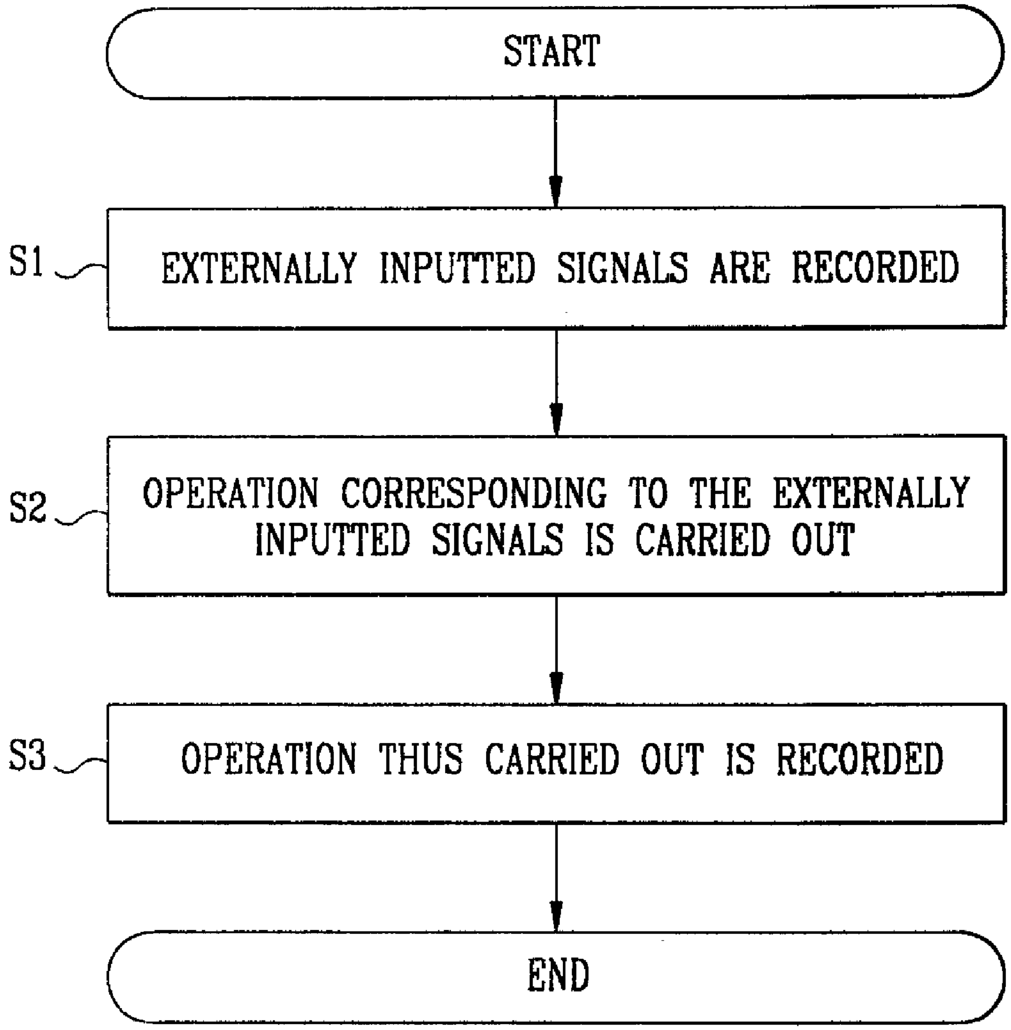
FIG. 2 is a flow chart showing the control operations of the operation-recording type system of the DDC monitor according to the method of the present invention.

FIG. 2 is a flow chart showing the control operations of the operation-recording type system of the DDC monitor according to the method of the present invention.

As shown in FIG. 2, the method according to the present invention includes the steps of: recording information of externally inputted signals into a storage device (EEPROM 15 of FIG. 1) upon receiving the externally inputted signals (S1); carrying out an operation corresponding to the externally inputted signals (S2); and recording the operation (corresponding to the externally inputted signals) in the storage device (S3).

Figure 3:
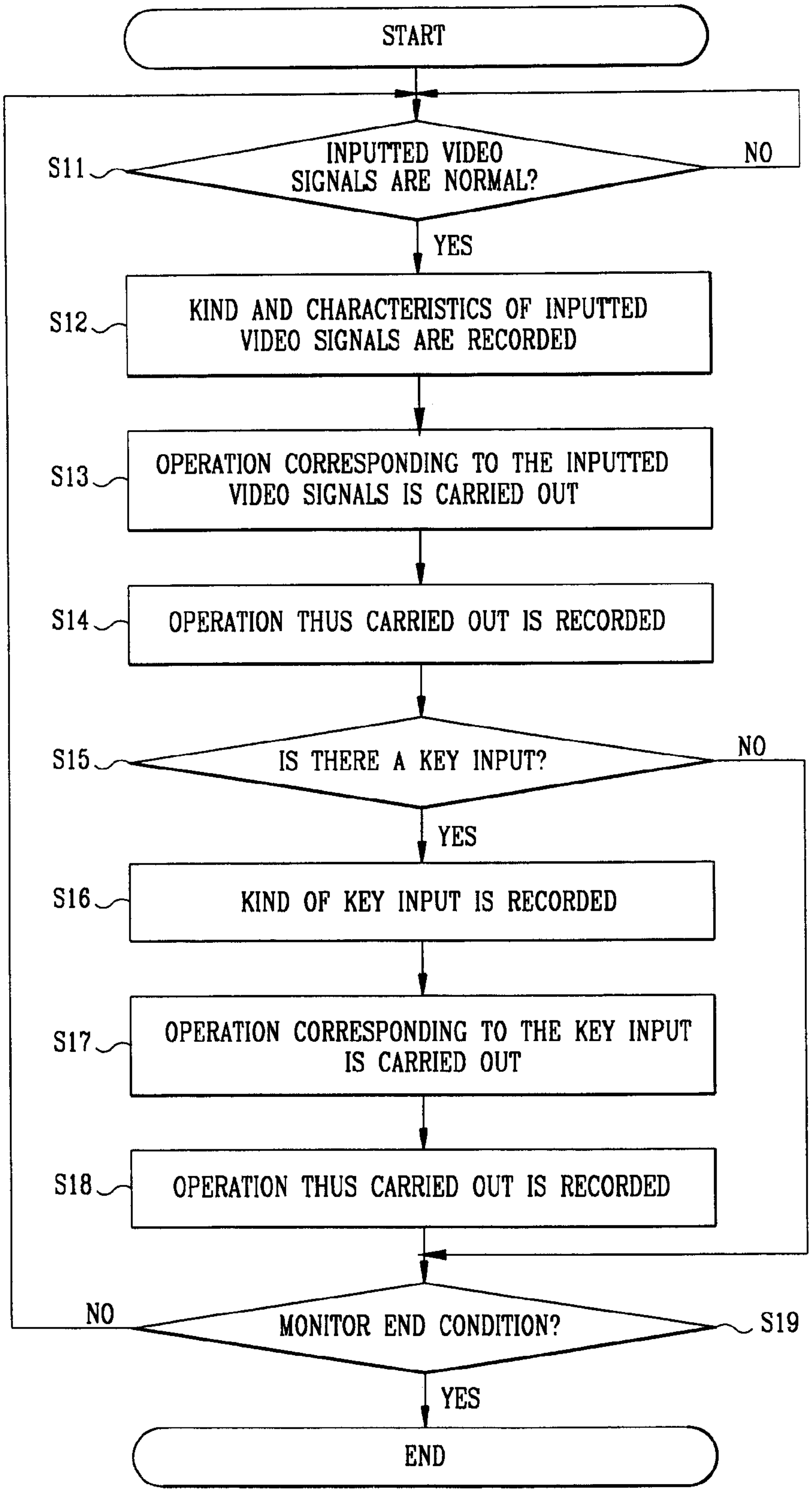
FIG. 3 is a flow chart showing in detail the control operations of the operation-recording type system of the DDC monitor according to the method of the present invention.

FIG. 3 is a flow chart showing in detail the control operations of the operation-recording type system of the DDC monitor according to the method of the present invention.

As shown in FIG. 3, the method according to the present invention includes the steps of: determining whether externally inputted video signals are normal (S11); recording the kind and characteristics of the externally inputted video signals into the storage device when the externally inputted video signals are normal (S12), carrying out an operation corresponding to the externally inputted video signals (S13); recording the operation (corresponding to the externally inputted video signals) in the storage device (S14); determining whether there is a key input signal (S15); recording the kind of key input signal into the storage device when there is a key input signal (S16); carrying out an operation corresponding to the key input signal (S17), and recording the operation (corresponding to the key input signal) in the storage device (S18). As mentioned above, the storage device is, preferably, EEPROM 15 of FIG. 1. If a monitor end condition is determined (S19), the process ends; otherwise a return to step S11 is carried out.

The operation and effects of the present invention will now be described with reference to FIGS. 1 thru 3. If the monitor is turned on, and if video signals are inputted into a video card (not illustrated) of the monitor, then the microcomputer 11 determines whether the inputted video signals are normal (S11).

Under this condition, if the inputted video signals are normal, then the microcomputer 11 carries out a control procedure such that the kind and characteristics of the inputted video signals are recorded into the EEPROM 15 (S12). The microcomputer 11 carries out a further control procedure such that an operation corresponding to the inputted video signals is carried out (S13).

That is, if the microcomputer 11 supplies the video signals to a video IC 14, then the video IC 14 properly processes the video signals, and supplies them to a cathode of a cathode ray tube (not shown) so that the images are displayed on the screen of the monitor. Under this condition, the microcomputer 11 records the above described operation in the EEPROM Then, the microcomputer 11 determines whether a user has inputted a key input signal through keyboard 16 (S15). If the key input signal has been inputted, then the microcomputer 11 causes the kind of key input signal to be recorded into the EEPROM 15 (S16). Furthermore, the microcomputer 11 causes an operation corresponding to the key input signal to be carried out (S17) Under this condition, the microcomputer 11 records the above-described operation in the EEPROM 15 (S18).

If the monitor shows an abnormal operation, then the user can read out the information which has been recorded in the EEPROM 15. Thus, the cause of the abnormal operation can be easily identified, and the error can be corrected. In this case, the information in the EEPROM 15 can be read into an external computer or into a jig 17 by utilizing the DDC protocol, so that the cause of the abnormal operation of the monitor can be identified.

In order to identify the cause of the abnormal operation, it is ideal that all operations of the microcomputer 11 be recorded in the EEPROM 15. However, there is a limit to the memory capacity of the EEPROM 15, and thus the microcomputer 11 may become overloaded. Therefore, only major causes of abnormal operation of the monitor are recorded in the EEPROM 15.

That is, the microcomputer 11 records information on various data, such as key input signals, video signals, horizontal frequencies, vertical frequencies, polarities of the frequencies, and the monitor usage time. Further, the microcomputer 11 records the communications with the major peripheral chips, such as a scaler and a frame rate converter, into the EEPROM 15.

There is a limit to the memory capacity of the EEPROM 15 as described above. Therefore, the records of the operations of the microcomputer 11 are updated frequently (i.e., every few seconds or every few minutes).

The method of the present invention can be more usefully employed by monitor developers, rather than by the monitor users, in identifying the cause of abnormal operation.

According to the present invention as described above, externally inputted signals and the corresponding microcomputer operations are recorded in a storage device. Therefore, the user of the monitor can easily identify the cause of abnormal operation, thereby making it easy to correct errors.

Although preferred embodiments of the present invention have been described, it will be understood by those skilled in the art that the present invention should not be limited to the described preferred embodiments. Rather, various changes and modifications can be made within the spirit and scope of the present invention as defined by the following claims.

What is claimed is:

1. An operation-recording type method for use in a display data channel (DDC) monitor, the method comprising the steps of:

recording information of externally inputted signals in a storage device upon receiving the externally inputted signals;

determining whether the externally inputted video signals are normal;

recording kinds and characteristics of the externally inputted video signals in the storage device when the externally inputted video signals are normal;

carrying out an operation corresponding to the externally inputted signals; and recording the operation corresponding to the externally inputted signals in the storage device.

2. The method as claimed in claim 1, further comprising the steps of:

determining whether there is an externally inputted key input signal;

recording a kind of the key input signal in the storage device when there is an externally inputted key input signal;

carrying out an operation corresponding to the key input signal; and recording the operation corresponding to the key input signal in the storage device.

3. The method as claimed in claim 1, wherein the recorded information includes at least one of key input signals, video signals, horizontal frequencies, vertical frequencies, polarities of frequencies, and monitor usage time.

4. An operation-recording type method for use in a display data channel (DDC) monitor, the method comprising the steps of:

recording information of externally inputted signals in a storage device upon receiving the externally inputted signals:

carrying out an operation corresponding to the externally inputted signals; and recording the operation corresponding to the externally inputted signals in the storage device;

wherein the recorded information includes at least one of monitor usage time and communications with major peripheral chips.

5. The method as claimed in claim 1, wherein the storage device is an electronically erasable programmable read-only memory (EEPROM).

6. An operation-recording type method for use in a display data channel (DDC) monitor, the method comprising the steps of:

recording information of externally inputted signals in a storage device upon receiving the externally inputted signals;

carrying out an operation corresponding to the externally inputted signals; and recording the operation corresponding to the externally inputted signals in the storage device;

wherein records of operations of a microcomputer are recorded in the storage device and are updated at predetermined intervals of time.

7. An operation-recording type system for controlling a display data channel (DDC) monitor, said system including a microcomputer and a storage device, said microcomputer comprising:

recording means for recording information of externally inputted signals in said storage device upon receiving the externally inputted signals; and executing means for carrying out an operation corresponding to the externally inputted signals;

wherein said recording means records the operation corresponding to the externally inputted signals in said storage device;

said microcomputer further comprising determining means for determining whether the externally inputted video signals are normal prior to said executing means carrying out the operation corresponding to the externally inputted signals; and wherein said recording means records kinds and characteristics of the externally inputted video signals in the storage device when the externally inputted video signals are normal.

8. The system as claimed in claim 7, said microcomputer further comprising determining means for determining whether there is an externally inputted key input signal; and wherein said recording means records a kind of the key input signal in said storage device when there is an externally inputted key input signal;

wherein said executing means carries out the operation corresponding to the key input signal; and wherein said recording means records the operation corresponding to the key input signal in said storage device.

9. The system as claimed in claim 7, wherein the recorded information includes at least one of key input signals, video signals, horizontal frequencies, vertical frequencies, polarities of frequencies, and monitor usage time.

10. An operation-recording type system for controlling a display data channel (DDC) monitor, said system including a microcomputer and a storage device said microcomputer comprising:

recording means for recording information of externally inputted signals in said storage device upon receiving the externally inputted signals; and executing means for carrying out an operation corresponding to the externally inputted signals;

wherein said recording means records the operation corresponding to the externally inputted signals in said storage device; and wherein the recorded information includes at least one of monitor usage time and communications with major peripheral chips.

11. The system as claimed in claim 7, wherein said storage device comprises an electronically erasable programmable read-only memory (EEPROM).

12. An operation-recording type system for controlling a display data channel (DDC) monitor, said system including a microcomputer and a storage device, said microcomputer comprising:

recording means for recording information of externally inputted signals in said storage device upon receiving the externally inputted signals; and executing means for carrying out an operation corresponding to the externally inputted signals;

wherein said recording means records the operation corresponding to the externally inputted signals in said storage device; and wherein records of operation of said microcomputer are recorded in said storage device and are updated at predetermined intervals of time.

13. The system as claimed in claim 7, wherein the externally inputted signals are video signals.

14. The system as claimed in claim 7, further comprising keyboard means for inputting the externally inputted key signal.

15. An operation-recording type method for use in a display data channel (DDC) monitor, the method comprising the steps of:

recording information of externally inputted signals in a storage device upon receiving the externally inputted signals;

determining whether the externally inputted video signals are normal;

recording kinds and characteristics of the externally inputted video signals in the storage device when the externally inputted video signals are normal; and carrying out an operation corresponding to the externally inputted signals.

16. The method as claimed in claim 15, further comprising the steps of:

determining whether there is an externally inputted key input signal;

recording a kind of the key input signal in the storage device when there is an externally inputted key input signal;

carrying out an operation corresponding to the key input signal; and recording the operation corresponding to the key input signal in the storage device.

17. The method as claimed in claim 15, wherein the recorded information includes at least one of key input signals, video signals, horizontal frequencies, vertical frequencies, polarities of frequencies, and monitor usage time.

18. The method as claimed in claim 15, wherein the recorded information includes at least one of monitor usage time and communications with major peripheral chips.

19. The method as claimed in claim 15, wherein records of operations of a microcomputer are recorded in the storage device and are updated at predetermined intervals of time.

20. An operation-recording type system for controlling a display data channel (DDC) monitor, said system including a microcomputer and a storage device, said microcomputer comprising:

recording means for recording information of externally inputted signals in said storage device upon receiving the externally inputted signals;

executing means for carrying out an operation corresponding to the externally inputted signals; and determining means for determining whether the externally inputted video signals are normal prior to said executing means carrying out the operation corresponding to the externally inputted signals;

wherein said recording means records kinds and characteristics of the externally inputted video signals in the storage device when the externally inputted video signals are normal.

21. The system as claimed in claim 20, said microcomputer further comprising determining means for determining whether there is an externally inputted key input signal; and wherein said recording means records a kind of the key input signal in said storage device when there is an externally inputted key input signal;

wherein said executing means carries out the operation corresponding to the key input signal; and wherein said recording means records the operation corresponding to the key input signal in said storage device.

22. The system as claimed in claim 20, wherein the recorded information includes at least one of key input signals, video signals, horizontal frequencies, vertical frequencies, polarities of frequencies, and monitor usage time.

23. The system as claimed in claim 20, wherein the recorded information includes at least one of monitor usage time and communications with major peripheral chips.

24. The system as claimed in claim 20, wherein records of operation of said microcomputer are recorded in said storage device and are updated at predetermined intervals of time.

* * * * *